(12) United States Patent
Ohanlon

(10) Patent No.: US 8,437,453 B2
(45) Date of Patent: May 7, 2013

(54) DYNAMIC MULTIPLE SERVER IVR STRINGS

(76) Inventor: Kenneth Peter Ohanlon, Denver, CO (US)

(*) Notice: Subject to any disclaimer, the term of this patent is extended or adjusted under 35 U.S.C. 154(b) by 1112 days.

(21) Appl. No.: 12/378,922

(22) Filed: Feb. 21, 2009

(65) Prior Publication Data
US 2010/0215155 A1    Aug. 26, 2010

(51) Int. Cl.
*H04M 1/64* (2006.01)

(52) U.S. Cl.
USPC ........................................ 379/76; 379/142.04

(58) Field of Classification Search .................. 379/67.1, 379/68, 70, 76, 142.01, 142.04
See application file for complete search history.

(56) References Cited

U.S. PATENT DOCUMENTS

| | | | | |
|---|---|---|---|---|
| 5,103,449 A * | 4/1992 | Jolissaint | | 370/384 |
| 5,729,600 A * | 3/1998 | Blaha et al. | | 379/266.07 |
| 5,737,393 A * | 4/1998 | Wolf | | 379/88.13 |
| 5,915,001 A * | 6/1999 | Uppaluru | | 379/88.22 |
| 7,062,020 B1 * | 6/2006 | Pirasteh et al. | | 379/88.18 |
| 7,881,285 B1 * | 2/2011 | Hammond | | 370/352 |
| 2004/0125939 A1 * | 7/2004 | Drobek | | 379/265.02 |
| 2006/0104425 A1 * | 5/2006 | Peters | | 379/88.19 |
| 2007/0041527 A1 * | 2/2007 | Tuchman et al. | | 379/88.22 |
| 2008/0008309 A1 * | 1/2008 | Dezonno et al. | | 379/265.02 |
| 2008/0267374 A1 * | 10/2008 | Colson et al. | | 379/142.06 |
| 2009/0285384 A1 * | 11/2009 | Pollock et al. | | 379/265.09 |
| 2010/0239075 A1 * | 9/2010 | Kobylevsky et al. | | 379/88.01 |

\* cited by examiner

*Primary Examiner* — Olisa Anwah
(74) *Attorney, Agent, or Firm* — Marian J. Furst; Craig W. Basber (57) ABSTRACT

The present invention teaches a multiple server based interactive voice response (IVR) system in which individual IVR strings on an index computer are associated with connections to external servers, the IVR system index computer accessible by each individual IVR string's self-identification telephone number either from Dialed Number Identification Service (DNIS) information, Automatic Number Identification (ANI) service information, item ID information provided by a caller or a combination thereof. When a call is received to the IVR system index computer, it uses DNIS, ANI and/or item ID information to route the call to string information (outgoing messages, menu options, etc) which might be located the index computer or on a clientele computer. In embodiments, the client business might be able to easily access the information associating options to messages and the message files themselves and change their IVR string without technical support.

10 Claims, 6 Drawing Sheets

Figure 1

PRIOR ART

DYNAMIC MULTIPLE SERVER IVR STRINGS

STATEMENT REGARDING FEDERALLY FUNDED RESEARCH

This invention was not made under contract with an agency of the US Government, nor by any agency of the US Government.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

CROSS-REFERENCE TO RELATED APPLICATIONS

The application claims the priority and benefit of U.S. Utility patent application Ser. No. 11/303,499 filed Dec. 17, 2005 in the name of the same inventor, Kenneth O'Hanlon, and entitled TEXT BROCHURE AND MEDIA SYSTEM AND METHOD, the entire disclosure of which in incorporated herein by this reference.

FIELD OF THE INVENTION

This invention relates generally to telephone response system devices, and specifically to interactive voice response devices.

BACKGROUND OF THE INVENTION

Interactive voice response systems allow customers to access by telephone a computer-controlled menu system and interact with that system either by pushing DTMF codes on their telephone or by speaking simple voice commands to the system.

While the use of IVR systems has become extremely common, a quick review of IVR systems is in order.

A caller may desire to obtain information (such as closing time) from a retail establishment (such as a department store). The customer dials the store number and receives a greeting, and the following dialog might ensue.

"Hello, welcome to the XYZ Department Store. For English, Press 1. Por Espanol, o prima el numero dos."

If the customer prefers English, they might press the "1" key on their telephone keypad. If they prefer Spanish, they might press "2". Either key will send a DTMF code, which is a pair of tones at standardized frequencies. One, for example is two tones, one at a frequency of 697 KHz and the other at a frequency of 1209 KHz. Two, on the other hand, is 697 KHz paired with 1336 KHz.

The IVR system of the department store will then decode the pair of tones sent. If the tones match the number 1, the IVR will proceed to play a next set of audible options (a verbal menu) in English, while if the tones decode as 2, the IVR will play the menu in Spanish. If the caller entered some other number or key such as 0, the IVR system will play an error message such as "That tone was not understood".

An example of a menu in English might be as follows. "For hours and locations, press 1. For payments, press 2. For a list of our departments, press 3. To hear about exciting new specials at the XYZ Department Store, press 4. To leave a message, press 5. To return to the previous menu, press 0."

Such dialogs can be quite lengthy and may involve numerous levels and options for large organizations.

Up to the present time, it had been necessary to individually program IVR systems, that is each individual IVR system up until now is unique. This individual programming requirement increases the cost of IVR systems dramatically due to the necessity to have teams of programmers work on each new IVR system.

It would be preferable to provide an IVR system which allows IVR offering establishments (hereinafter "IVR owner") to set-up, customize and change their own IVR systems with minimal technical assistance, whether the IVR string is located on the IVR service's computer (and index computer) or on a computer belonging to an IVR owning client organization.

It would be preferable to provide an IVR system which accesses information on IVR strings stored on client computers to provide the various outgoing messages and options of the IVR string.

It would be further preferable to provide an IVR system which transfers execution of an IVR string to client computers to provide the various outgoing messages and options of the IVR string.

It would be further preferable to provide an IVR system which is dynamic based upon a combination of ANI data from the number dialing the IVR, DNIS information from the number dialed to reach the IVR and item ID, indicating which particular item is of interest, and further if the IVR system allowed transfer to different computers potentially belonging to different clients depending on this information.

SUMMARY OF THE INVENTION

General Summary

The present invention teaches a multiple server based interactive voice response (IVR) system in which an index computer receives calls initially placed. Individual IVR strings in a database of such strings on the index computer may be associated with connections to external servers operated by clients of the IVR service. It will be understood that the "clients" of the IVR service are businesses and other organizations wishing to have IVR strings which they themselves can easily customize and which are dynamic during execution depending on information automatically collected during the call. "Callers" on the other hand are individuals calling any one of a number of telephone numbers which are associated with strings, presumably regarding products or services which they wish to purchase. "Strings" will be the collection of data files which have in any standard audio format audio outgoing messages (OGM), audio menu options for callers, and associations of menu options to further strings or actions to be taken.

Thus the IVR system index computer is accessible by each individual IVR string's self-identification telephone number and from a Dialed Number Identification Service (DNIS) it will know which number a caller dialed, which information may in turn identify a client, a string, a connection to an outside computer of a client, a product, a combination of these or otherwise. The DNIS may advantageously also identify a set of "Welcome" and "Language Menu" OGM files to be played to callers to that number, thus making the execution of the string dynamic depending upon the DNIS dialed.

Automatic Number Identification (ANI) service information, which identifies the number from which the caller is calling ("Caller ID") may also be collected. The system may further prompt the caller for an "item ID", and any of these items of information, or more, or a combination thereof, may be used to transfer the call to the appropriate string of OGMs, menu associations, outside computers and so on.

In other words, when a call is received to the IVR system index computer, it uses DNIS, ANI and/or item ID information to route the call to string information (outgoing messages, menu options, etc) which might be located the index computer or on a computer owned by a client business of the service. The outside computer may take over execution of the string or the index computer may communicate with the outside computer and retain overall execution based upon information sent from the outside computer.

In embodiments, the client business might be able to easily access the information associating options to messages and the message files themselves and change their IVR string without technical support.

Summary in Reference to Claims

It is therefore yet another aspect, advantage, objective and embodiment of the present invention, in addition to those discussed previously, to provide a multiple server based interactive voice response (IVR) system for use with a telephone not part of the system, the multiple server IVR comprising:
  a database of individual IVR strings, each individual IVR string associated with at least a self-identification telephone number and a first server connection to an external server, the multiple server based IVR system telephone accessible by each individual IVR string's self-identification telephone number;
  a first telephone number identifier operative to receive a first telephone number from a Dialed Number Identification Service (DNIS) when such first telephone calls the multiple server based IVR system at a first one of the self-identification telephone numbers;
  the first telephone number identifier further operative to compare the first telephone number received to each of the telephone numbers associated with the individual IVR strings;
  the first telephone number identifier operative to activate the first server connection to the external server of the individual IVR string associated with the self-identification telephone number matching the first telephone number.

It is therefore another aspect, advantage, objective and embodiment of the present invention to provide a multiple server based interactive voice response (IVR) system, wherein the individual IVR strings each further comprise:
  a first greeting message associated with the individual IVR string;
  at least one set of at least two individual interactive responses available in the individual IVR string;
  a second post-response message associated with the individual IVR string and further associated with at least one of the individual interactive responses;
  and wherein the multiple server based IVR system further comprises:
  a string executor operative to play the messages of the individual IVR string when the individual IVR string is activated.

It is therefore yet another aspect, advantage, objective and embodiment of the present invention to provide a multiple server based interactive voice response (IVR) system, wherein the individual IVR string messages further comprise:
  files of a format selected from the group consisting of: BREW file format, MP3 format, M4P format, DCT format, VOX format, WMA format, WAV format, GSM format, AAC format, MP4 format, M4A format, MID format, MMF format, OGG format, ATRAC format, RA format, RAM point file, DSS format, MSV format, DVF format, IVS format, MPC format, FLAC format, AIFF format, a raw file, AU format, IKLAX format, other formats now known or later developed and combinations thereof.

It is therefore another aspect, advantage, objective and embodiment of the present invention to provide a multiple server based interactive voice response (IVR) system, wherein the string executor further is a module of the multiple server based interactive voice response (IVR) system.

It is therefore another aspect, advantage, objective and embodiment of the present invention to provide a multiple server based interactive voice response (IVR) system, wherein the string executor further is based on the external server of the individual IVR string.

It is therefore another aspect, advantage, objective and embodiment of the present invention to provide a multiple server based interactive voice response (IVR) system, wherein the first server connection is a computer network.

It is therefore another aspect, advantage, objective and embodiment of the present invention to provide a multiple server based interactive voice response (IVR) system, wherein the computer network is the Internet.

It is therefore another aspect, advantage, objective and embodiment of the present invention to provide a multiple server based interactive voice response (IVR) system, further comprising:
  at least one association module allowing creation and change of the association of the second post-response message with at least one of the individual interactive responses.

It is therefore another aspect, advantage, objective and embodiment of the present invention to provide a multiple server based interactive voice response (IVR) system, wherein:
  the database further comprises at least two individual IVR strings both associated with the same self-identification telephone number;
  the database further comprises a second telephone number associated with the individual IVR string;
  and further comprising a second telephone number identifier operative to receive therein a second telephone number from an Automatic Number Identification (ANI) service when the first telephone calls the multiple server based IVR system;
  and wherein the second telephone number identifier is further operative to compare the second telephone number to each of the second telephone numbers associated with the individual IVR strings;
  the wherein the connection is further operative to activate the first server connection to the external server of the individual IVR string associated with the second telephone number received from the ANI service as well as the self-identification telephone number matching the first telephone number.

It is therefore another aspect, advantage, objective and embodiment of the present invention to provide a multiple interactive voice response (IVR) system controllable by a non-technical individual IVR system owner, wherein:

a database of individual IVR strings, each individual IVR string in turn comprising:
   a first telephone number associated with the individual IVR string;
   a first greeting message associated with the individual IVR string;
   at least one set of at least two individual interactive responses available in the individual IVR string;
   a second post-response message associated with the individual IVR string and further associated with at least one of the individual interactive responses;
the database of individual IVR strings further allowing access to each of the telephone numbers associated with the individual IVR strings;
a first telephone number identifier operative to receive a first telephone number from a Dialed Number Identification Service (DNIS) when a first telephone calls the multiple IVR system at the first telephone number;
the first telephone number identifier further operative to compare the first telephone number to each of the telephone numbers associated with the individual IVR strings;
an initiator operative to attach an individual IVR string associated with a telephone number matching the first telephone number;
a connection operative to connect the first telephone to the individual IVR string associated with the telephone number matching the first telephone number;
at least one recording module allowing such non-technical individual IVR system owner to record at least one of the first and second messages without technical assistance.

It is therefore yet another aspect, advantage, objective and embodiment of the present invention to provide a multiple interactive voice response (IVR) system controllable by a non-technical individual IVR system owner, wherein:
   at least one association module allowing such non-technical individual IVR system owner to create and change such association of the second post-response message with at least one of the individual interactive responses.

It is therefore yet another aspect, advantage, objective and embodiment of the present invention to provide a multiple interactive voice response (IVR) system controllable by a non-technical individual IVR system owner, wherein:
   the database further comprises at least two individual IVR strings both associated with the same first telephone number;
   the database further comprises a second telephone number associated with the individual IVR string;
   and further comprising a second telephone number identifier operative to receive therein a second telephone number from an Automatic Number Identification (ANI) service when the first telephone calls the multiple IVR system;
   and wherein the second telephone number identifier is further operative to compare the second telephone number to each of the telephone numbers associated with the individual IVR strings;
   and wherein the initiator is further operative to attach an individual IVR string associated with the second telephone number;
   and wherein the connection is further operative to connect the first telephone to the individual IVR string associated with the telephone number matching the second telephone number received from an ANI service as well as the telephone number matching the first telephone number received from the DNIS.

It is therefore yet another aspect, advantage, objective and embodiment of the present invention to provide a multiple interactive voice response (IVR) system controllable by a non-technical individual IVR system owner, wherein:
   the database further comprises a product ID number associated with the individual IVR string;
   and further comprising a product ID number identifier operative to query for and receive a product ID number from the first telephone;
   and wherein the product ID number identifier is further operative to compare the product ID number to each of the product ID numbers associated with the individual IVR strings;
   and wherein the initiator is further operative to attach an individual IVR string associated with the product ID number;
   and wherein the connection is further operative to connect the first telephone to the individual IVR string associated with the matching product ID number.

INDEX TO REFERENCE NUMERALS

| Telephone | 100 |
|---|---|
| Telephone call | 102 |
| Computer | 104 |
| Relational/Script database | 106 |
| Telephone | 200 |
| Telephone call | 202 |
| IVR index computer | 204 |
| Multiple script database | 206 |
| User association module | 208 |
| User telephone | 210 |
| User telephone call to association module | 212 |
| Telephone | 300 |
| Telephone call | 302 |
| IVR index computer | 304 |
| Connection | 306 |
| External server one | 308 |
| External server two | 310 |
| Multiple script database one | 312 |
| Multiple script database two | 314 |
| User association module one | 316 |
| User association module two | 318 |
| Telephone | 400 |
| Telephone call | 402 |
| IVR index computer | 404 |
| Connection | 406 |
| External server one | 408 |
| External server two | 410 |
| Multiple script database one | 412 |
| Multiple script database two | 414 |
| User association module on index computer | 416 |
| DNIS identifier | 502 |
| Welcome and language selection menu message(s) | 504 |

-continued

| | |
|---|---|
| Language selector | 506 |
| ANI identifier | 510 |
| Item selector message | 512 |
| Item selector | 514 |
| Connect to external server | 516 |
| String | 518 |
| Welcome | 1000 |
| Language Menu | 1010 |
| Get Item ID | 1020 |
| Web to Client Server | 1030 |
| ANI Received? | 1035 |
| ANI Confirm | 1040 |
| Get Number | 1050 |
| Web to Client Server | 1060 |
| Goodbye | 1070 |
| Transfer | 9000 |

DETAILED DESCRIPTION

Figure 1:
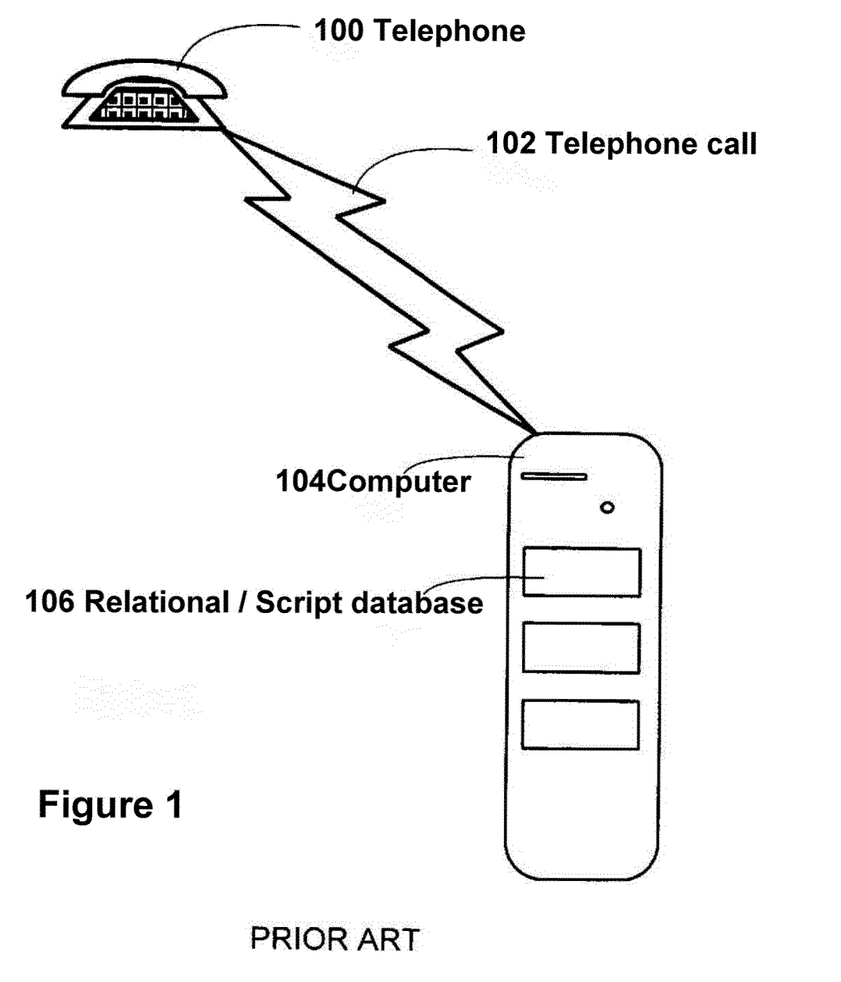
FIG. 1 is a diagram of a simple PRIOR ART IVR system.

FIG. 1 is a diagram of a simple PRIOR ART IVR system. Telephone 100 is used to make telephone call 102 to computer 104 which then plays out relational/script database 106. This script will be programmed by technical personnel of the firm, telco, IT company etc which provides the IVR service. The script will not normally be directly accessible by personnel of the client firm which hires the IVR service from the telecom company. Normally, the IVR will not collect ANI or DNIS information and if collected, it is normally used only for identification of the caller, for example, to ease locating the caller's account.

The IVR system of PRIOR ART is centralized on the computer 104 and centralized again in being controlled by the IVR service provider, not the client firm.

Figure 2:
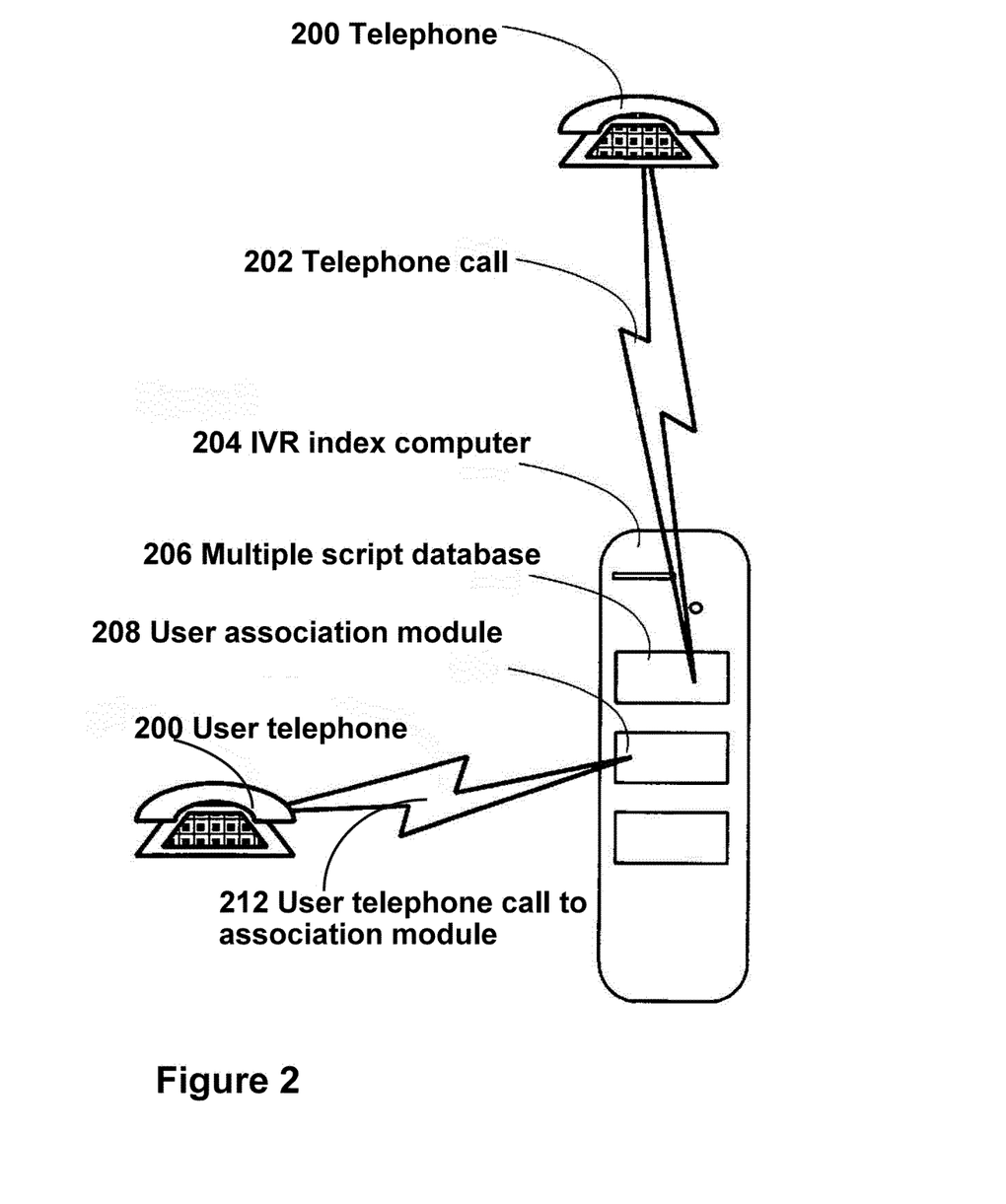
FIG. 2 is a block diagram of a first embodiment of the present invention, a single server embodiment.

FIG. 2 is a block diagram of a first embodiment of the present invention, a single server embodiment.

Telephone 200 may make telephone call 202 to IVR index computer 204. Index computer 204 may be a computer owned by an organization which has a number of IVR strings available. Such organizations may be telecomms, IVR providers or the like, or may be owned by an organization which does not make IVRs available to outside firms, that is, a client firm which chooses to serve as its own IVR provider.

Multiple script database 206 is a database of individual IVR strings, each individual IVR string associated with at least a self-identification telephone number. When the DNIS information (the telephone number dialed by the caller) is recovered from the telephone system, the number is used to identify which of the plurality of strings in the database is activated.

Each string will have its own logic structure of audio files to be played as outgoing messages (OGMs) to callers, and its own logic structure to be used to route calls depending on the voice or DTMF responses the caller makes for such menus.

User association module 208 allows a client who has an IVR string on the index computer 204 to use a telephone 210 to make telephone call to association module 212. The association mode 212 is operative to accept commands from the IVR owner on ways to restructure the IVR to use, as an example, a different OGM file in response to a certain input from a caller. Thus the business whose IVR string is hosted on the index computer 204 may change their own string without technical assistance.

Note that the user association module 208 and the other user control modules (such as modules allowing a user to record a new OGM to replace an old one) may themselves be controlled by and be a second IVR system, this one run by the IVR service company (the telephone company, IT company or the like) for the benefit of their own customers, the IVR owners or client companies, when the clients which to change their IVRs. The client company or individual may thus change their IVR without assistance by tech support personnel of the IVR service provider.

A surprising range of file types may be used to provide the OGMs, including but not limited to: files of a format selected from the group consisting of: MP3 format, DCT format, VOX format, WMA format, WAV format, GSM format, AAC format, MP4 format, M4A format, MID format, MMF format, OGG format, ATRAC format, RA format, RAM pointfile, DSS format, MSV formt, DVF format, IVS format, MPC format, FLAC format, AIFF format, a raw file, AU format, IKLAX format, other formats now known or later developed and combinations thereof.

Figure 3:
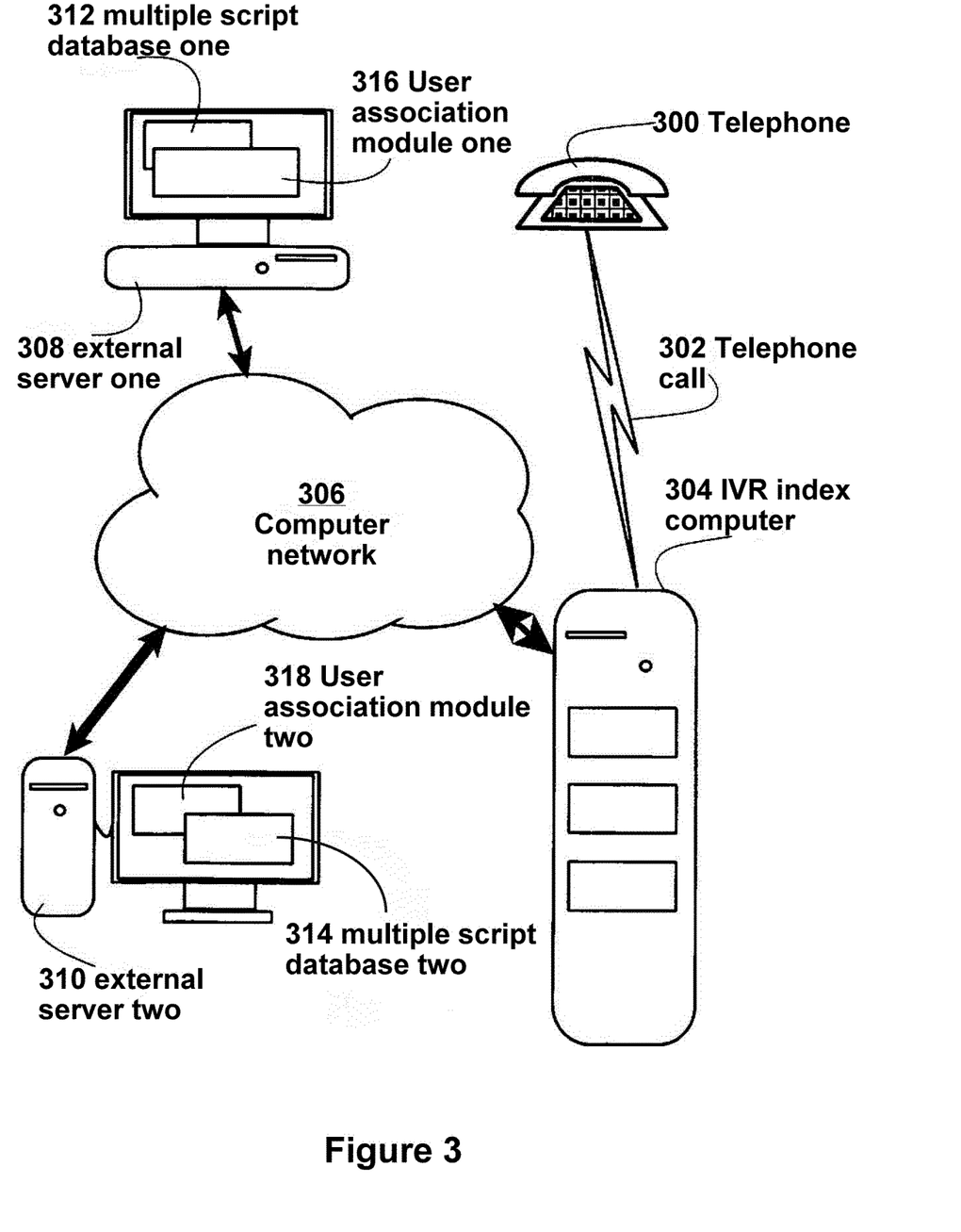
FIG. 3 is a block diagram of a second embodiment of the present invention, a multiple server embodiment.

FIG. 3 is a block diagram of a second embodiment of the present invention, a multiple server embodiment. Telephone 300 may be used by a caller (as distinguished from a client) to make telephone call 302 to IVR index computer 304. The index computer has thereon, in the database of IVR strings, less than a totality of the strings themselves by virtue of not necessarily having thereon every OGM file and association of responses with files or DNIS or ANI origin numbers with OGM files. Rather, the database in this case may primarily have a series of server connections to one or more external servers, the multiple server based IVR system telephone still accessible by each individual IVR string's self-identification telephone number but acting to transfer the call via webservices or other computer networks or other networks (even a redirection via the telephone network) generally grouped as "connections" such as connection 306.

The transferred call may be directed to another general purpose computer appropriately programmed with one or more IVR strings by means of a first telephone number identifier operative to receive a first telephone number from a Dialed Number Identification Service (DNIS) of a telephone company whenever a caller calls the multiple server based IVR system at a first one of the self-identification telephone numbers.

The first telephone number identifier is operative to compare the telephone number received to each of the telephone numbers associated with the individual IVR strings and then to activate the first server connection to the external server of the individual IVR string associated with the self-identification telephone number matching the first telephone number. Thus if telephone call DNIS information received from the telephone company matches, in the database of the index computer 304, the self-identification number is associated with a certain string.

Connection 306 may thus be used to access, depending upon DNIS received, either external server one 308 or external server two 310. The external server one 308 has been programmed with multiple script database one 312, while external server two 310 has been programmed with multiple script database two 314. User association module one 316 programmed into general purpose computer 308 and user association module two 318 programmed into general purpose computer 310 serve the same functions with different structure as user association module 208 programmed into the index computer in the previous embodiment: they allow a user/IVR owning client to alter their own OGMs and associations without the help of technical support staff of the IVR provider.

An example of the use of the present system now follows.

Business AAA (which might be a seller, a service provider, a non-profit, an individual, or any type of organization whatsoever) contracts with the IVR provider named "IVRS'R US"

for four different IVR strings. AAA is the "client". The first two strings will be for real estate in a particular district of Chicago, the third string will be for building supplies throughout the Midwest and West and the fourth string is for vacation packages marketed in the Denver area. Due to the changing nature of the travel and real estate industries, AAA needs to update and change its IVR system, the first, second and fourth strings, practically daily.

IVRS'R US has from AAA three telephone numbers which are then put into the index database of IVR strings of the IVRS'R US index computer. The first two strings are both potentially accessible from the first telephone number, that is, both are associated with that number. The other two strings have only a single incoming number associated therewith. This information may summarized in TABLE ONE, which table may also serve as an exemplary extremely simplified data structure.

TABLE ONE

| STRING | PRODUCT | NUMBER (used with DNIS) | ANI NUMBERS COVERED | FILE TO ACCESS |
|---|---|---|---|---|
| 1 | 17227 River St. | 800-000-0000 | 312, 815, 331, 630 ... | welcome1.wav |
| 2 | 1719 Oak Dr. | 800-000-0000 | 312, 815, 331, 630 ... | welcome1.wav |
| 3 | Building Supplies | 877-000-0001 | 312, 313, 314, 315, 316 ... | langmenu.wma |
| 4 | Travel Packages | 303-000-0002 | 303, 720, 719, 917 | greeting1.mp3 |

End Table One

This index server will be the point of contact for anyone dialing any one of these three numbers (strings one and two share an incoming number) and may be the first contact for anyone calling any of a large plurality of other numbers from numerous other clients of IVRS'R US. The index computer database includes a large number of associations, including but not limited to an association of a particular DNIS number (identifying the number called) to a particular welcome message file and a particular language selection menu, and the associations of DTMF codes received after offering menus with particular actions in response. The same database associations include connections to various outside computers of various clientele organizations including AAA. The database also includes routing information based upon ANI numbers, that is, for either string one or string two, the callers are expected to have (and may have calls routed dependent upon) their "Caller ID" information, such as Chicago regional area codes 312, 630, etc.

The AAA organization computer, which is operative to receive the connection from the IVRS'R US index computer has its own list of files for outgoing messages (OGMs), associations of menu options such as DTMF or voice commands received from callers with further OGMs, and so on. The AAA computer furthermore has a module operative to allow the AAA personnel to alter the associations and OGMs without consultation nor assistance from technical support personnel of the IVRS R'Us company. This module/modules may instead be located on the IVRS'R US computers, including the index computer, in addition to or in lieu of being on the AAA computer systems.

A call is received by the index computer. The DNIS information received with the call may identify the call as being made to the AAA travel IVR string, the fourth of the four AAA strings. If so, the call may be routed to the AAA computer system string number 4 without further ado. The ANI information may also be received and identify the call as coming from a number located neither in Chicago nor in Denver, which would identify the call as coming to the third string (building materials) even if the DNIS information was not received or was shared with some other product or company. If so, the call may be routed to the AAA computer system string number 3 without further ado. As noted, the order of receiving any given item of information may vary, and the order of execution may vary. In the presently preferred embodiment and best mode presently contemplated for carrying out the invention, the welcome message may be on the index computer, which may gather DNIS information, ANI information and product ID information before routing the call out to a given string on the AAA computer or on the index computer itself.

In the example, the call is from the 312 (original Chicago) area code (this is ANI information received from the telephone company), the number dialed has a DNIS information (number dialed, for example, last 4 digits) which is "0000", that is, the number shared by strings one and two. The index computer may dynamically route the call to a file called "welcome1.wav" and play that audio file as an OGM to the caller.

The AAA company may have created this file with or without technical support from the IVRS'R US company staff, and based on the demographics of the Chicago area decided that the "welcome1.wav" message will offer an OGM with language choices much like this:

"Thank you for calling Real Deal Chicago, your Windy City Real Estate source! Press "1" for English and "2" for Polish!"

If the caller had called from the 303 area code (ANI information) or to the 303-000-0002 incoming line (DNIS information) then the message might instead have been:

"Thank you for calling Rocky Rocky Travel! Press "1" for English, pero Espanol o prima el numero dos."

Thus, even the greeting and language menus offered may depend dynamically on the DNIS or the ANI.

Since the caller dialed DNIS 0000 from area code 312, they will receive the first menu. This menu can lead to a string in English or another string in Polish. Assuming English was chosen, the fact that this menu can lead to two different products means they may then receive the following instructions:

"Please enter the street number of the home you are interested in!"

If the caller pushes the numbers 17227 they will then be directed to string one, while if they push 1719 they will be directed to string number two. String number one may provide information relative to the first home, while string two may provide information relative to the second home.

The index computer may then activate the connection to the AAA company computer, using the connection information appropriate to the string selected. However, within the two strings, even the menu options offered may be different. If 17227 River Street has a garage but 1719 Oak Drive does not, the following menu option fragment might be present in string one but not string two: " . . . and press or say 9 for information about the spacious, finished three car garage . . . ", with a corresponding audio file to play if the caller presses or says 9.

As noted, the ordering of gathering information and making transfers to different strings may be variable, and in fact, in a given situation, even the menu choices which the caller is presented with may be different depending upon the DNIS information or the ANI information.

Figure 4:
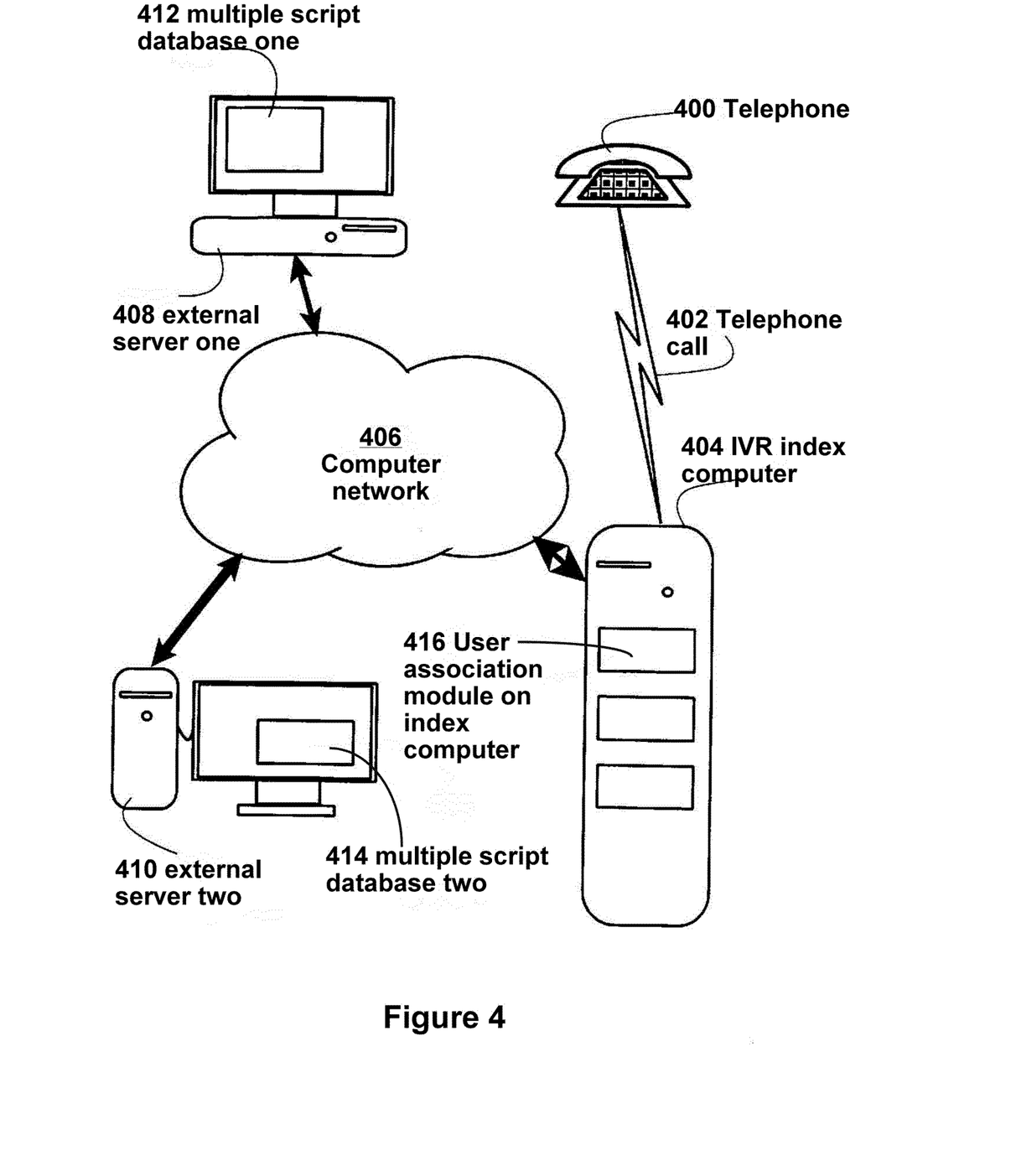
FIG. 4 is a block diagram of a third embodiment of the present invention, a multiple server embodiment with a centralized user association module.

FIG. 4 is a block diagram of a third embodiment of the present invention, a multiple server embodiment with a centralized user association module.

Telephone 400 originates a call 402 to the multiple server IVR systems IVR index computer 404. Based upon DNIS, ANI, and/or item ID, the index computer 404 will make a connection 406 to either of external server one 408 or external server two 410, having respective multiple script database one 412 and multiple script database two 414 programmed thereon. User association module on index computer 416 however, is centralized: thus the users would be able to change the audio files at their own computers 408 or 410 but not be able to change associations without dialing into or contacting the IVR index machine 404. This might be enforced, despite the lower level of user convenience, in order to run association changes through a logic verification module and ensure that user changes don't cause nonsensical system behavior, dropped calls or the like.

Figure 5:
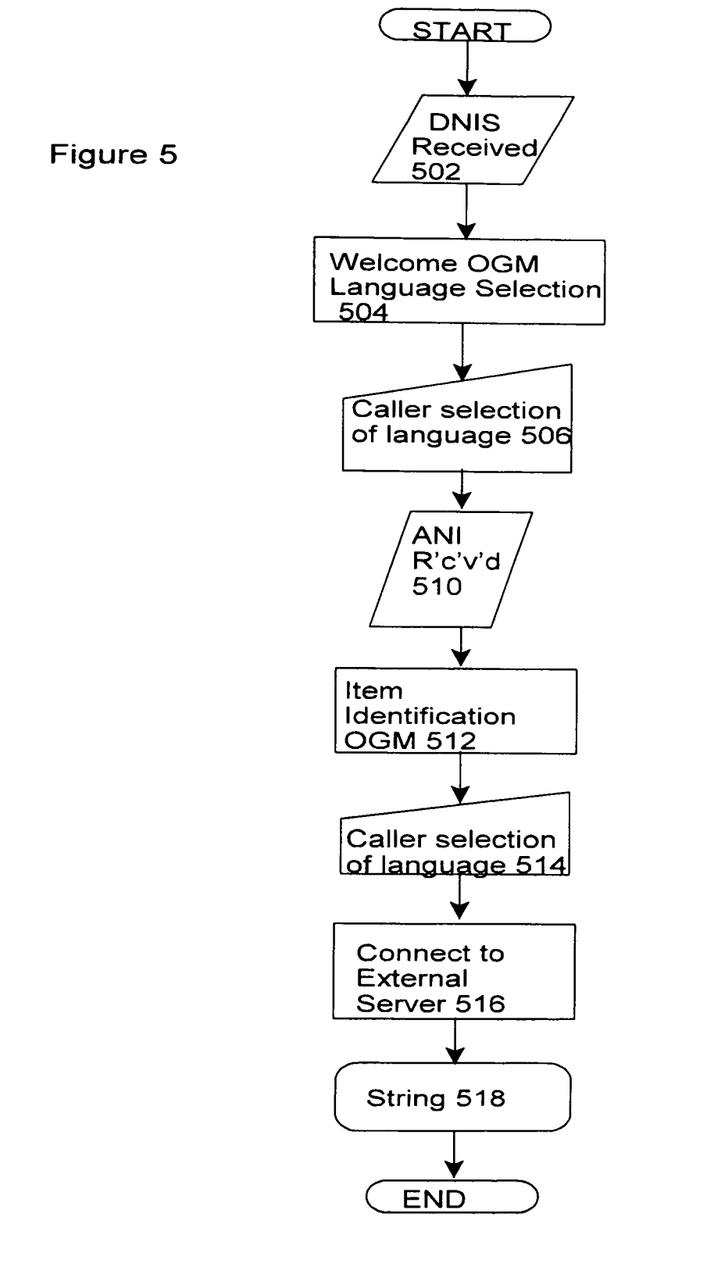
FIG. 5 is a flow chart of a process embodiment of the invention, showing steps which the invention may carry out.

FIG. 5 is a flow chart of a process embodiment of the invention, showing steps which the invention may carry out.

It is very important to understand that telephone systems customarily provide DNIS and ANI system at the beginning of an incoming call, however, the present invention is extremely flexible in terms of logic of flow and can have the decision structure substantially re-arranged within the scope of the appended claims.

DNIS identifier (step 502) accepts the DNIS and stores it. Welcome and language selection menu message(s) at step 504 allow users to select the language of their choice. Note that even this first OGM, the language selection greeting, may be dynamically based upon the DNIS or ANI received. As suggested by the example above, a call to or from a number related to Denver might offer English and Spanish as the lingual options while a call related to Chicago might offer English and Polish and a call related to New York City might offer a very long list indeed.

Language selector (step 506) is operative to receive the user's response to the language menu, while ANI identifier step 510 (which may well be before the language selection OGM or after or operating concurrently) is operative to accept and store the caller's number.

Item selector message step 512 allows a user to identify an item, much like the difference between strings one and two in the example: a menu might offer the available choices audibly or it might simply prompt for an input such as street number, as in the example. Item selector step 514 is operative to accept the user selection. Thereafter step 516 is establishing a connection to external server(s) to activate the server, database or individual string 518 which has been selected based upon user inputs, DNIS and ANI numbers and so on.

Crucially, the IVR index machine need not do all the work, the string is partially or wholly under the control of the user and the DNIS/ANI information allows a dynamic greeting selection and later dynamic routing.

Note that based upon DNIS or ANI information, zip code information can also be generated and used or transferred either way between computers. In addition, reverse phone lookup information may be generated by either computer and used or transferred between the machines as well.

For example, a caller might call in and based on the ANI information, their zip code, name and location might be found by the index server. Based on the DNIS information (the number called to) a zip code of interest (for example, the zip code in which the individual is house hunting might also be found. The index server might then send this information to a client computer for use by the string that will be invoked. Alternatively, the machines might be exchanging the information in the other direction or using it themselves, etc.

Figure 6:
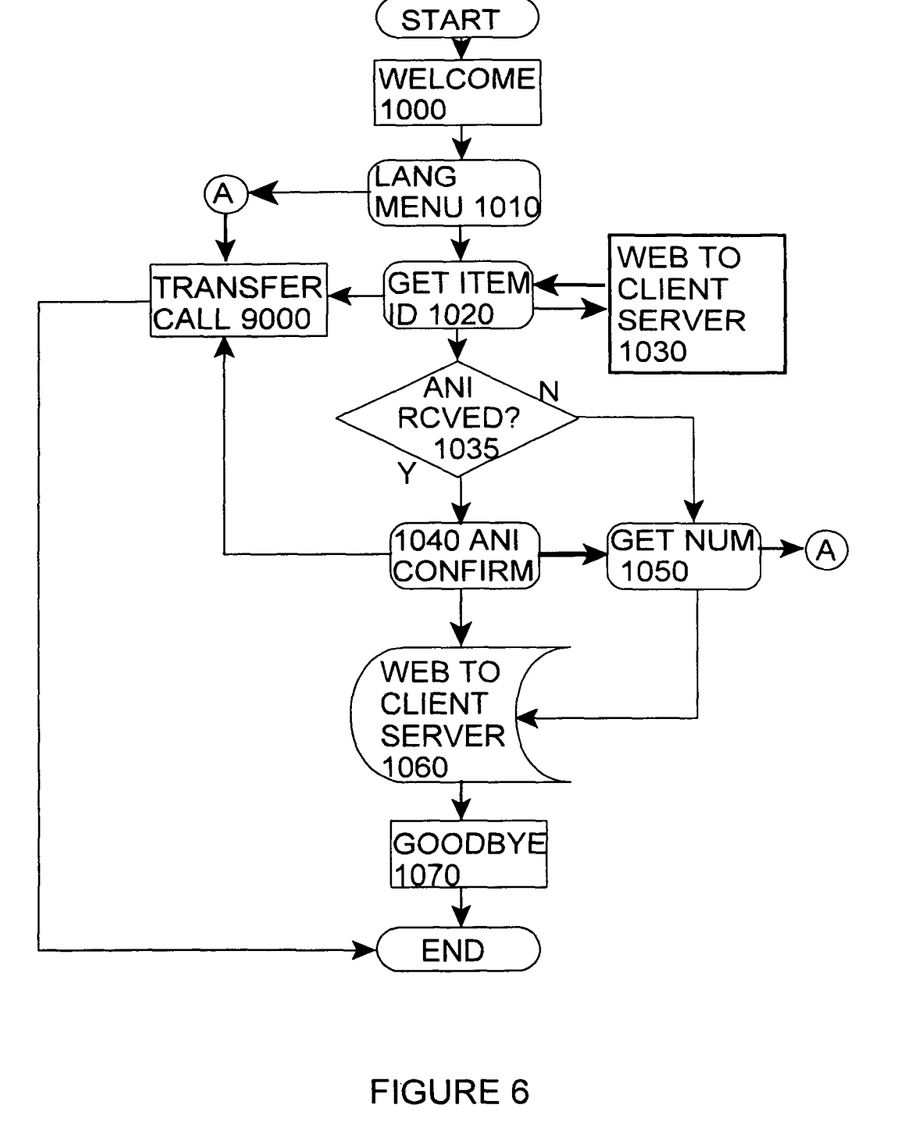
FIG. 6 is a flow chart of a process embodiment of the invention in greater detail.

FIG. 6 is a flow chart of a process embodiment of the invention in greater detail, based on which one current configuration is being implemented.

Welcome 1000 and language menu 1010 may be based upon DNIS generated by and received from the telecomms service provider.

Get Item ID 1020 on the other hand allows a customer/caller to enter information specifying their own interest or issue.

Web to client server step 1030 allows not just a single referral to an outside client computer but indicates that throughout the execution of the IVR string, the "index" computer and the "outside" computer may be connecting and exchanging information. For example, in embodiments the outside computer might actually provide individual OGMs, menu options and possible response associations to the index machine for execution to the caller, then when the index machine receives a user response, receive the response from the index machine, process it, and provide another set of string information. Such a system might be slower than other embodiments discussed, but under certain circumstances might be desirable.

ANI received query 1035 and ANI confirm 1040 show that normal error and fault processing is available: the system may prompt users for information which is not received from the telecomms provider as desired. For example, if ANI gets lost before receipt by the IVR system, the user might be prompted for it at step 1040 or 1050. The same may apply to DNIS reception.

Web connection to client server 1060 and an optional goodbye 1070 may occur. Note that a goodbye OGM from the index computer may frequently not be appropriate if the outside server is continuing to execute a string without the index machine, or in embodiments in which the index computer is running the string, it may be desirable.

Transfer 9000 may thus lead to the termination of the index computer operation on the telephone call even without a goodbye.

It is important to note that the device may include security protocols, such as sending an exchange of encrypted code numbers or names so the systems can authenticate to each other.

The disclosure is provided to render practicable the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A multiple server based interactive voice response (IVR) system for use by a caller with a first telephone not part of the system, the multiple server based IVR comprising:

a general purpose computer programmed with a database of individual IVR strings, each individual IVR string associated with at least a self-identification telephone number and a first server connection to an external server, the multiple server based IVR system telephone accessible by each individual IVR string's self-identification telephone number;

a first telephone number identifier operative to receive a first telephone number from a Dialed Number Identification Service (DNIS) when such first telephone calls the multiple server based IVR system at a first one of the self-identification telephone numbers;

the first telephone number identifier further operative to compare the first telephone number received to each of the telephone numbers associated with the individual IVR strings;

the first telephone number identifier operative to activate the first server connection to the external server of the individual IVR string associated with the self-identification telephone number matching the first telephone number:

wherein the individual IVR strings each further comprise:

a first greeting message associated with the individual IVR string;

at least one set of at least two individual interactive responses available in the individual IVR string;

a second post-response message associated with the individual IVR string and further associated with at least one of the individual interactive responses;

and wherein the multiple server based IVR system further comprises:

a string executor operative to play the messages of the individual IVR string when the individual IVR string is activated;

wherein:

the database further comprises at least two individual IVR strings both associated with the same self-identification telephone number;

the database further comprises a second telephone number associated with the individual IVR string;

and further comprising a second telephone number identifier operative to receive therein a second telephone number from an Automatic Number Identification (ANI) service when the first telephone calls the multiple server based IVR system;

and wherein the second telephone number identifier is further operative to compare the second telephone number to each of the second telephone numbers associated with the individual IVR strings;

and wherein the connection is further operative to activate the first server connection to the external server of the individual IVR string associated with the second telephone number received from the ANI service as well as the self-identification telephone number matching the first telephone number.

2. The multiple server based interactive voice response (IVR) system of claim 1, wherein the individual IVR string messages further comprise:

files of a format selected from the group consisting of: BREW file format, MP3 format, DCT format, VOX format, WMA format, WAV format, GSM format, AAC format, MP4 format, M4A format, MID format, MMF format, OGG format, ATRAC format, RA format, RAM point file, DSS format, MSV formt, DVF format, IVS format, MPC format, FLAC format, AIFF format, a raw file, AU format, IKLAX format, other formats now known and combinations thereof.

3. The multiple server based interactive voice response (IVR) system of claim 1, wherein the string executor further is a module of the multiple server based interactive voice response (NR) system.

4. The multiple server based interactive voice response (IVR) system of claim 1, wherein the string executor further is based on the external server of the individual IVR string.

5. The multiple server based interactive voice response (IVR) system of claim 1, wherein the first server connection is a computer network.

6. The multiple server based interactive voice response (IVR) system of claim 5, wherein the computer network is the Internet.

7. The multiple server based interactive voice response (IVR) system of claim 1, further comprising:

at least one association module allowing creation and change of the association of the second post-response message with at least one of the individual interactive responses.

8. A multiple interactive voice response (IVR) system controllable by a non-technical individual IVR system owner, the multiple IVR system comprising:

a database of individual IVR strings, each individual IVR string in turn comprising:

a first telephone number associated with the individual IVR string;

a first greeting message associated with the individual IVR string;

at least one set of at least two individual interactive responses available in the individual IVR string;

a second post-response message associated with the individual IVR string and further associated with at least one of the individual interactive responses;

the database of individual IVR strings further allowing access to each of the telephone numbers associated with the individual IVR strings;

a first telephone number identifier operative to receive a first telephone number from a Dialed Number Identification Service (DNIS) when a first telephone calls the multiple IVR system at the first telephone number;

the first telephone number identifier further operative to compare the first telephone number to each of the telephone numbers associated with the individual IVR strings;

an initiator operative to attach an individual IVR string associated with a telephone number matching the first telephone number;

a connection operative to connect the first telephone to the individual IVR string associated with the telephone number matching the first telephone number;

at least one recording module allowing such non-technical individual IVR system owner to record at least one of the first and second messages without technical assistance:

wherein:

the database further comprises at least two individual IVR strings both associated with the same first telephone number;

the database further comprises a second telephone number associated with the individual IVR string;

and further comprising a second telephone number identifier operative to receive therein a second telephone number from an Automatic Number Identification (ANI) service when the first telephone calls the multiple IVR system;

and wherein the second telephone number identifier is further operative to compare the second telephone number to each of the telephone numbers associated with the individual IVR strings;

and wherein the initiator is further operative to attach an individual IVR string associated with the second telephone number;

and wherein the connection is further operative to connect the first telephone to the individual IVR string associated with the telephone number matching the second telephone number received from an ANI service as well as the telephone number matching the first telephone number received from the DNIS.

9. The multiple interactive voice response (IVR) system controllable by a non-technical individual IVR system owner of claim 8, further comprising:
- at least one association module allowing such non-technical individual IVR system owner to create and change such association of the second post-response message with at least one of the individual interactive responses.

10. The multiple interactive voice response (IVR) system controllable by a non-technical individual NR system owner of claim 8, wherein:
- the database further comprises a product ID number associated with the individual IVR string;
- and further comprising a product ID number identifier operative to query for and receive a product ID number from the first telephone;
- and wherein the product ID number identifier is further operative to compare the product ID number to each of the product ID numbers associated with the individual IVR strings; and wherein the initiator is further operative to attach an individual IVR string associated with the product ID number;
- and wherein the connection is further operative to connect the first telephone to the individual IVR string associated with the matching product ID number.

* * * * *